United States Patent
Kumagai et al.

(10) Patent No.: US 9,528,571 B2
(45) Date of Patent: Dec. 27, 2016

(54) TRANSMISSION

(71) Applicant: HONDA MOTOR CO., LTD., Tokyo (JP)

(72) Inventors: Nobuhiro Kumagai, Wako (JP); Shunji Kamo, Wako (JP); Kazuki Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/679,750

(22) Filed: Apr. 6, 2015

(65) Prior Publication Data

US 2015/0292570 A1 Oct. 15, 2015

(30) Foreign Application Priority Data

Apr. 9, 2014 (JP) .................. 2014-080062

(51) Int. Cl.
*F16D 23/06* (2006.01)
*F16H 3/08* (2006.01)
*F16D 23/02* (2006.01)
*F16H 3/00* (2006.01)

(52) U.S. Cl.
CPC ................. *F16H 3/08* (2013.01); *F16D 23/06* (2013.01); *F16D 23/025* (2013.01); *F16H 3/006* (2013.01)

(58) Field of Classification Search
CPC ... F16D 23/025; F16D 23/06; F16D 2011/002
See application file for complete search history.

(56) References Cited

U.S. PATENT DOCUMENTS

2005/0120818 A1* 6/2005 Matsufuji ............... F16D 23/06
74/339

FOREIGN PATENT DOCUMENTS

JP 2012-57786 A 3/2012

* cited by examiner

*Primary Examiner* — Huan Le
(74) *Attorney, Agent, or Firm* — Westerman, Hattori, Daniels & Adrian, LLP

(57) ABSTRACT

If a sleeve of a double cone-type synchronizer is not smoothly engaged with a dog gear because of getting caught by the dog gear, the dog gear, as pressed by the sleeve, may lean with a spline-connecting part of the dog gear to a transmission gear as a fulcrum, so that an inner ring of a blocking ring may be damaged by being squeezed between the dog gear and a hub. However, the transmission gear includes: a tooth surface portion having tooth surfaces formed on one axial end side of the transmission gear; and a contact portion formed on the opposite axial end side, and abutting against the dog gear. The contact portion extends radially outward of a through-hole of the dog gear, thereby preventing the dog gear, as pressed by the sleeve, from leaning toward the transmission gear so as to prevent damage of the inner ring.

7 Claims, 5 Drawing Sheets

TRANSMISSION

BACKGROUND OF THE INVENTION

Field of the Invention

The present invention relates to a transmission comprising a synchronizer capable of connecting together a hub which is connected to a rotary shaft, and a dog gear relatively unrotatably spline-connected to a transmission gear which is relatively rotatably supported on the rotary shaft, wherein the synchronizer includes a sleeve spline-connected to the hub so as to be relatively unrotatable, and slidable in an axial direction, and a blocking ring disposed between the hub and the dog gear, and enabling the hub and the dog gear to frictionally engage with each other in response to movement of the sleeve.

Description of the Related Art

Japanese Patent Application Laid-open No. 2012-57786 has made publicly known a transmission including a double cone-type synchronizer which connects a rotary shaft of the transmission and a transmission gear supported on the rotary shaft so as to be relatively rotatable, the synchronizer including a blocking ring formed of three members, namely, an outer ring, an inner ring and an intermediate ring. Friction members provided to an inner peripheral surface of the outer ring are brought into contact with an outer peripheral surface of the intermediate ring, while friction members provided to an outer peripheral surface of the inner ring are brought into contact with an inner peripheral surface of the intermediate ring, thereby producing synchronous torque for synchronizing rotation of the rotary shaft and rotation of the transmission gear with each other.

In some of the above-mentioned double cone-type synchronizers, a dog gear is spline-connected to the transmission gear, and a sleeve supported by a hub is slid in an axial direction and engaged with dog teeth of the outer ring and dog teeth of the dog gear. However, if the engagement is not smoothly made, the dog gear, as pressed by the sleeve, may lean with a part of the dog gear spline-connected to the transmission gear as a fulcrum so that the inner ring may be damaged by being strongly squeezed between the dog gear and the hub.

SUMMARY OF THE INVENTION

The present invention has been made with the foregoing situation taken into consideration. An object of the present invention is to, by use of a simple structure, prevent a dog gear of a double cone-type synchronizer from leaning and thus damaging an inner ring.

In order to achieve the object, according to a first aspect of the present invention, there is provided a transmission comprising a synchronizer capable of connecting together a hub which is connected to a rotary shaft, and a dog gear relatively unrotatably spline-connected to a transmission gear which is relatively rotatably supported on the rotary shaft, wherein the synchronizer includes a sleeve spline-connected to the hub so as to be relatively unrotatable, and slidable in an axial direction, and a blocking ring disposed between the hub and the dog gear, and enabling the hub and the dog gear to frictionally engage with each other in response to movement of the sleeve, the blocking ring includes an outer ring disposed on an outer side of the blocking ring in a radial direction, having dog teeth meshable with the sleeve in an outer periphery of the outer ring, and engaged with the hub so as to be relatively rotatable by a predetermined angle, an inner ring disposed on an inner side of the blocking ring in the radial direction, and engaged with the hub so as to be relatively rotatable by a predetermined angle, and an intermediate ring disposed between the outer ring and the inner ring in the radial direction, and being in slide contact with an inner peripheral surface of the outer ring and an outer peripheral surface of the inner ring, wherein the dog gear includes a recessed portion engaged with a protrusion of the intermediate ring, the transmission gear includes a tooth surface portion formed on one axial end side of the transmission gear, and having tooth surfaces; and a contact portion formed on an opposite axial end side of the transmission gear, and being in contact with the dog gear, and the contact portion extends outward of the recessed portion in the radial direction.

According to the first aspect, when the sleeve which is spline-connected to the hub fixed to the rotary shaft is slid in the axial direction of the rotary shaft, pressing force of the sleeve produces friction force between friction members of the outer ring and the intermediate ring, as well as between friction members of the inner ring and the intermediate ring; and rotation of the dog gear, which is spline-connected to the transmission gear with the recessed portion of the dog gear engaged with the protrusion of the intermediate ring, synchronizes with rotation of the hub. Thereby, the sleeve is smoothly engaged with the dog gear, and the transmission gear is connected to the rotary shaft.

If the sleeve is not smoothly engaged with the dog gear because of getting caught by the dog gear, the dog gear, as pressed by the sleeve, may lean with a part of the dog gear spline-connected to the transmission gear as a fulcrum so that the inner ring may be damaged because of being squeezed between the dog gear and the hub. However, since the transmission gear includes: the tooth surface portion having the tooth surfaces formed on the one axial end side of the transmission gear; and the contact portion formed on the opposite axial end side of the transmission gear, and being in contact with the dog gear, as well as since the contact portion extends outward of the recessed portion of the dog gear in the radial direction, it is possible to prevent the dog gear, as pressed by the sleeve, from leaning toward the transmission gear, and to prevent the inner ring from becoming damaged.

According to a second aspect of the present invention, in addition to the first aspect, the hub includes a plurality of recessed portions spaced out in a peripheral direction, the inner ring includes a plurality of protrusions fitted in the recessed portions of the hub, and a plurality of cutouts formed in an end surface of the inner ring on a dog gear side at positions corresponding to the plurality of recessed portions of the hub.

According to the second aspect, the hub includes the multiple recessed portions spaced out in the peripheral direction, and the inner ring includes the protrusions fitted in the recessed portions of the hub, and the multiple cutouts formed in the end surface of the inner ring on the dog gear side at the positions corresponding to the multiple recessed portions. Therefore, no pressing force from the dog gear acts on parts corresponding to the cutouts. For this reason, it is possible to prevent arc-shaped deformation between adjacent protrusions and damage of the inner ring due to the pressing force.

According to a third aspect of the present invention, in addition to the first or second aspect, the recessed portion of the dog gear is a through-hole penetrating through the dog gear in the axial direction.

According to the third aspect, since the recessed portion of the dog gear is the through-hole penetrating through the dog gear in the axial direction, not only is the recessed portion easier to process than a recessed portion which does not penetrate through the dog gear, but also it is possible to prevent fragility which, if the recessed portion did not penetrate therethrough, would occur in thinner portions created in conjunction with such recessed portion after heat treatment.

According to a fourth aspect of the present invention, there is provided the transmission according to the first or second aspect, further comprising: a first input shaft, a second input shaft and an output shaft disposed in parallel to one another; a first clutch and a second clutch which selectively transmit driving force of a driving source to any of the first input shaft and the second input shaft; a plurality of input gears supported relatively rotatably on the first and second input shafts; a plurality of output gears fixedly provided to the output shaft, and meshing with the plurality of input gears; a first synchronizer capable of connecting the first input shaft to a first input gear which is one of the plurality of input gears supported on the first input shaft; and a second synchronizer capable of connecting the second input shaft to a second input gear which is one of the plurality of input gears supported on the second input shaft, wherein the first input gear meshes with a first output gear which is one of the plurality of output gears, the second input gear meshes with a second output gear which is another of the plurality of output gears, the rotary shaft is the first input shaft, the transmission gear is the first input gear, the synchronizer is the first synchronizer, and an outer peripheral portion of the second output gear is opposite to an outer peripheral portion of a cylindrical portion which is formed between the tooth surface portion and the contact portion of the transmission gear, and which is smaller in diameter than the tooth surface portion and the contact portion.

According to the fourth aspect, the first and second output gears are provided to the output shaft; the first input gear meshes with the first output gear; and the second input gear meshes with the second output gear. Thereby, it is possible to decrease load on the first and second output gears. On the contrary, if the first input gear provided to the first input shaft and the second input gear provided to the second input shaft mesh with a common output gear provided to the output shaft, load on the output gear becomes larger. The configuration of the fourth aspect, meanwhile, involves a risk that: the second output gear interferes with the first input gear which is the transmission gear provided to the first input shaft; and a layout accordingly becomes difficult. To reduce the risk, the outer peripheral portion of the second output gear is opposite to the outer peripheral portion of the cylindrical portion which is formed between the tooth surface portion and the contact portion of the transmission gear, and which is smaller in diameter than the tooth surface portion and the contact portion. Thereby, it is possible to avoid the interference between the first input gear and the second output gear, and to realize a compact layout.

It should be noted that: a first input shaft 11 of an embodiment corresponds to the rotary shaft of the present invention; a first output shaft 13 of the embodiment corresponds to the output shaft of the present invention; a third speed input gear 24 of the embodiment corresponds to the transmission gear or the first input gear of the present invention; a second speed input gear 28 of the embodiment corresponds to the second input gear of the present invention; a third speed-reverse output gear 32 of the embodiment corresponds to the first output gear of the present invention; a second speed output gear 33 of the embodiment corresponds to the second output gear of the present invention; through-holes 55c of the embodiment correspond to the recessed portions of the present invention; an engine E of the embodiment corresponds to the driving source of the present invention; a third-fifth speed synchronizer S1 of the embodiment corresponds to the synchronizer or the first synchronizer of the present invention; and a second-fourth speed synchronizer S3 of the embodiment corresponds to the second synchronizer of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

Descriptions will be hereinbelow provided for an embodiment of the present invention on the basis of FIGS. 1 to 5.

Figure 1:
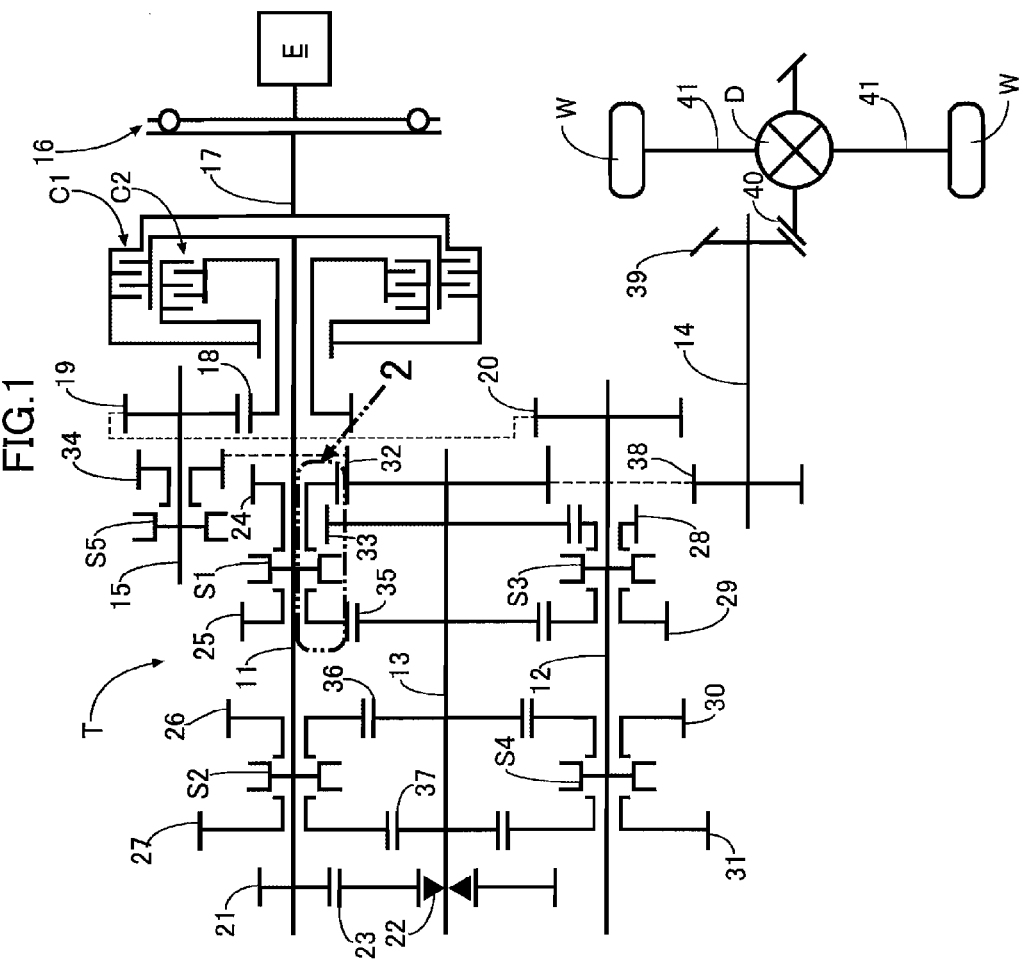
FIG. 1 is a skeletal diagram of a twin-clutch transmission.

As shown in FIG. 1, a twin-clutch transmission T with nine forward speeds and one reverse speed includes a first input shaft 11, a second input shaft 12, a first output shaft 13, a second output shaft 14 and an idler shaft 15 which are disposed in parallel to one another. A main input shaft 17 connected to an engine E via a flywheel 16 is connected to the first input shaft 11 via a first clutch C1, and is connected to a drive gear 18, which is supported on the first input shaft 11 so as to be relatively rotatable, via a second clutch C2. The drive gear 18 meshes with an idler gear 19 fixedly provided to the idler shaft 15. The idler gear 19 meshes with a driven gear 20 fixedly provided to the second input shaft 12. Thus, once the first clutch C1 is engaged, driving force of the engine E is transmitted to the first input shaft 11 via the flywheel 16, the main input shaft 17 and the first clutch C1 in this sequence. Once the second clutch C2 is engaged, the driving force of the engine E is transmitted to the second input shaft 12 via the flywheel 16, the main input shaft 17, the second clutch C2, the drive gear 18, the idler gear 19 and the driven gear 20 in this sequence.

A first speed input gear 21 fixedly provided to the first input shaft 11 meshes with a first speed output gear 23 supported on the first output shaft 13 via a one-way clutch 22. A third speed input gear 24 and a fifth speed input gear 25 are supported on the first input shaft 11 so as to be relatively rotatable. The third speed input gear 24 and the fifth speed input gear 25 are selectively connectable to the first input shaft 11 via a third-fifth speed synchronizer S1. Furthermore, a seventh speed input gear 26 and a ninth speed input gear 27 are supported on the first input shaft 11 so as to be relatively rotatable. The seventh speed input gear 26 and the ninth speed input gear 27 are selectively connectable to the first input shaft 11 via a seventh-ninth speed synchronizer S2.

A second speed input gear 28 and a fourth speed input gear 29 are supported on the second input shaft 12 so as to be relatively rotatable. The second speed input gear 28 and the fourth speed input gear 29 are selectively connectable to the second input shaft 12 via a second-fourth speed synchronizer S3. Furthermore, a sixth speed input gear 30 and an eighth speed input gear 31 are supported on the second input shaft 12 so as to be relatively rotatable. The sixth speed input gear 30 and the eighth speed input gear 31 are selectively connectable to the second input shaft 12 via a sixth-eighth speed synchronizer S4.

A third speed-reverse output gear 32 meshing with the third speed input gear 24 is fixedly provided to the first output shaft 13. A second speed output gear 33 meshing with the second speed input gear 28 is also fixedly provided to the first output shaft 13. A reverse idler gear 34, which is supported on the idler shaft 15 so as to be relatively rotatable and is connectable to the idler shaft 15 via a reverse synchronizer S5, meshes with the third speed-reverse output gear 32.

The fifth speed input gear 25 and the fourth speed input gear 29 mesh with a common fourth-fifth speed output gear 35. The seventh speed input gear 26 and the sixth speed input gear 30 mesh with a common sixth-seventh speed output gear 36. The ninth speed input gear 27 and the eighth speed input gear 31 mesh with a common eighth-ninth speed output gear 37.

The third speed-reverse output gear 32 meshes with a final gear 38 fixedly provided to the second output shaft 14. A first bevel gear 39 fixedly provided to the second output shaft 14 meshes with a second bevel gear 40 provided to a differential gear D. Left and right driving wheels W are connected to drive shafts 41 extending from the differential gear D, respectively.

Thus, once all of the third-fifth speed synchronizer S1 to the reverse synchronizer S5 are disengaged, the one-way clutch 22 is engaged and a first speed gear stage is established. In addition, once the second-fourth speed synchronizer S3 connects the second speed input gear 28 to the second input shaft 12, a second speed gear stage is established. Once the third-fifth speed synchronizer S1 connects the third speed input gear 24 to the first input shaft 11, a third speed gear stage is established. Once the second-fourth speed synchronizer S3 connects the fourth speed input gear 29 to the second input shaft 12, a fourth speed gear stage is established. Once the third-fifth speed synchronizer S1 connects the fifth speed input gear 25 to the first input shaft 11, a fifth speed gear stage is established. Once the sixth-eighth speed synchronizer S4 connects the sixth speed input gear 30 to the second input shaft 12, a sixth speed gear stage is established. Once the seventh-ninth speed synchronizer S2 connects the seventh speed input gear 26 to the first input shaft 11, a seventh speed gear stage is established. Once the sixth-eighth speed synchronizer S4 connects the eighth speed input gear 31 to the second input shaft 12, an eighth speed gear stage is established. Once the seventh-ninth speed synchronizer S2 connects the ninth speed input gear 27 to the first input shaft 11, a ninth speed gear stage is established. In addition, once the reverse synchronizer S5 connects the reverse idler gear 34 to the idler shaft 15, a reverse speed gear stage is established.

Next, descriptions will be provided for a structure of the third-fifth speed synchronizer S1 on the basis of FIGS. 2 to 5. The structure of the third-fifth speed synchronizer S1 is substantially left-right symmetric. Descriptions will be provided mainly for the structure of a right half of the third-fifth speed synchronizer S1, namely the structure of a portion where the third speed input gear 24 is connected to the first input shaft 11.

Figure 2:
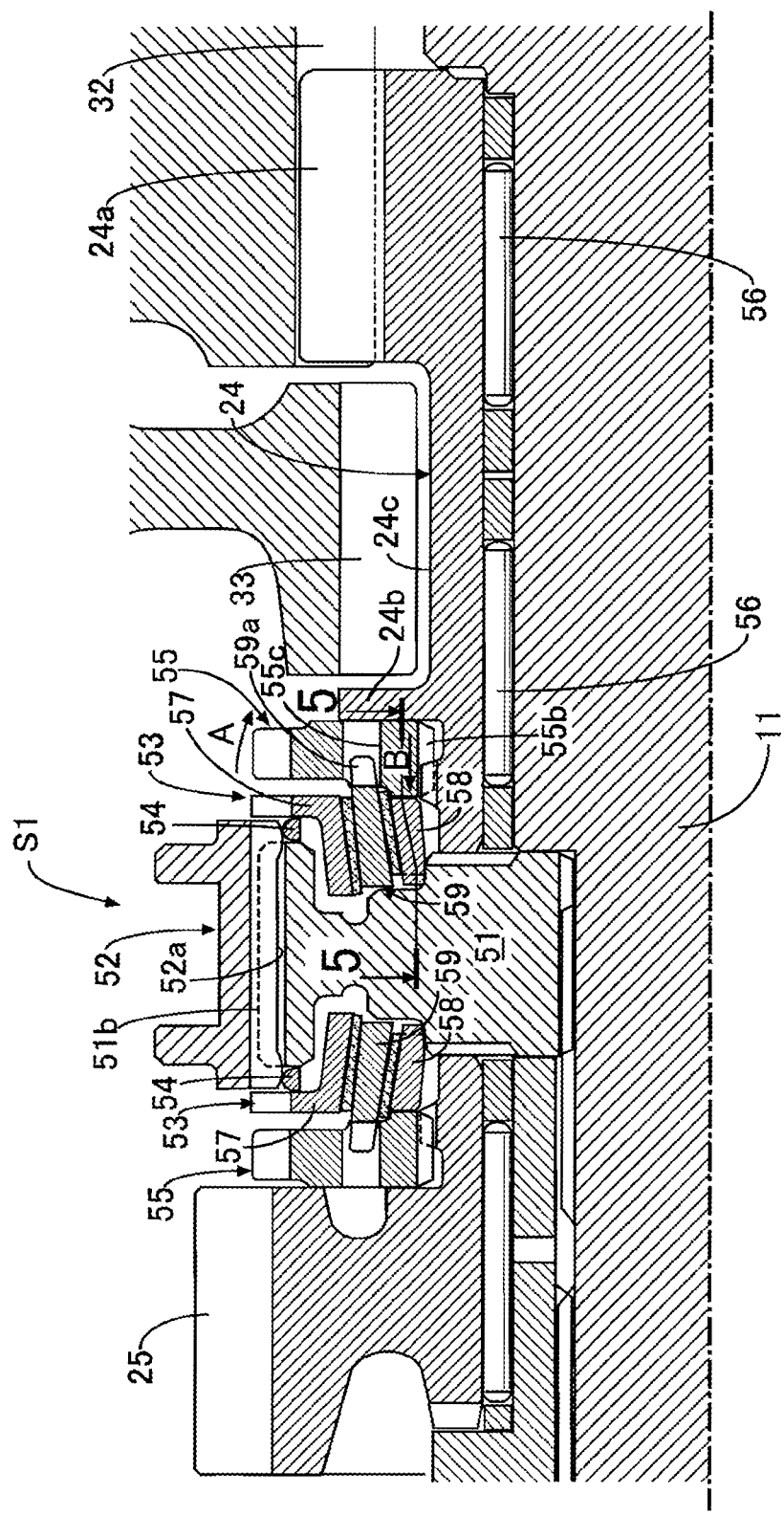
FIG. 2 is an enlarged view of a section 2 in FIG. 1.
Figure 3:
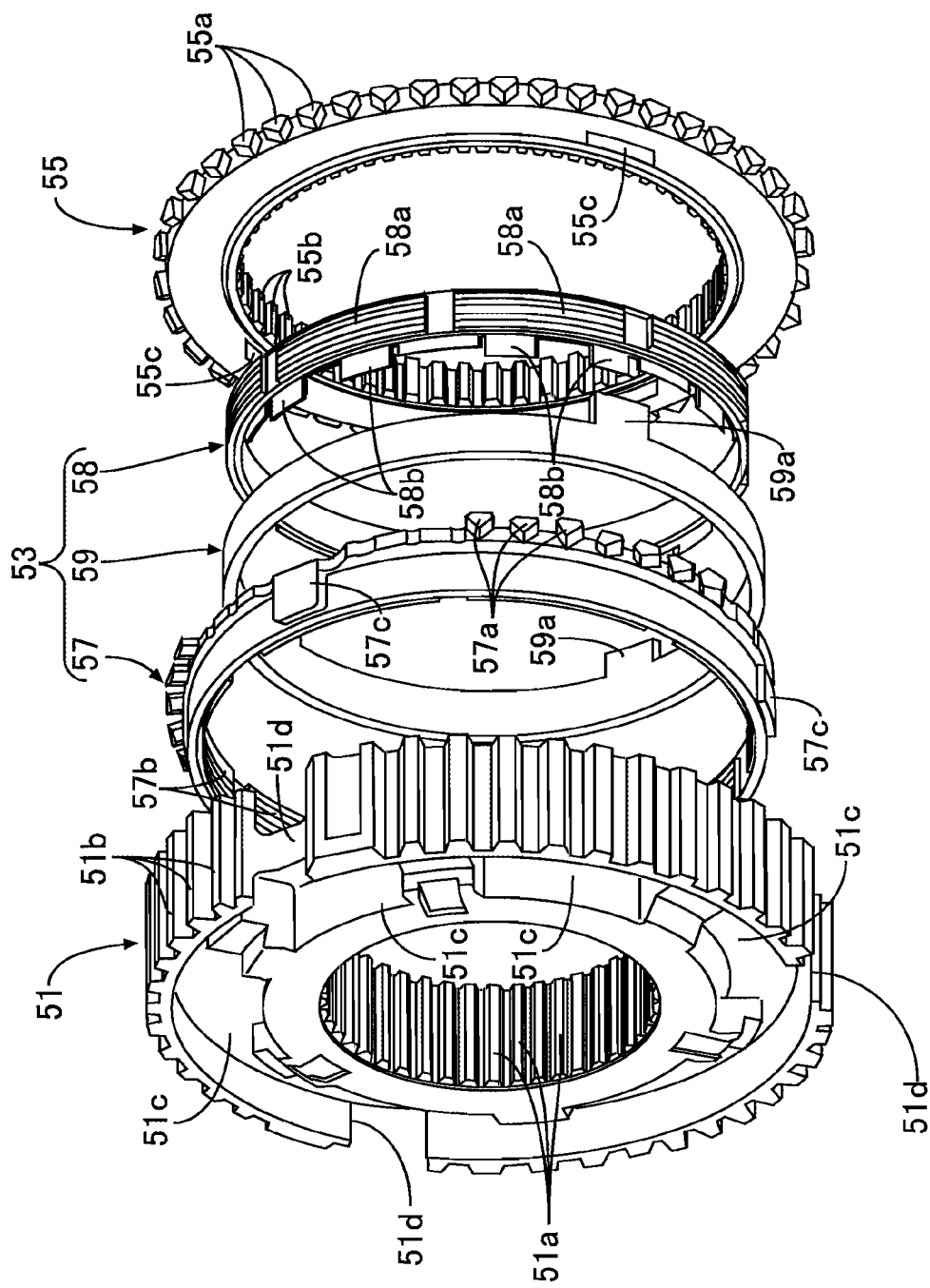
FIG. 3 is an exploded perspective view of a hub and a blocking ring.
Figure 4:
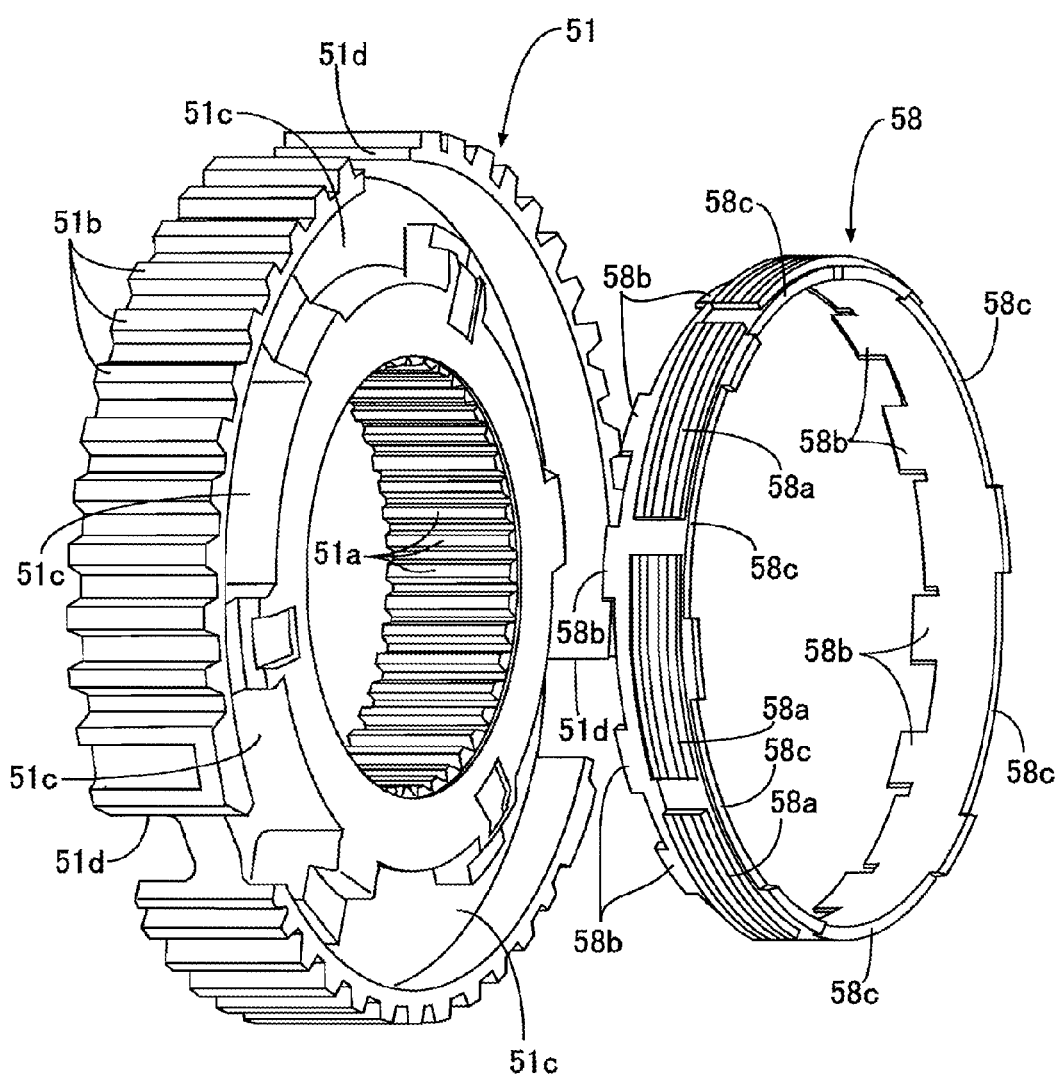
FIG. 4 is an exploded perspective view of the hub and an inner ring.

FIG. 2 is an enlarged view of a section 2 in FIG. 1, where the third-fifth speed synchronizer S1 is shown upside down for the purpose of making the structure of the third-fifth speed synchronizer S1 easy to understand. The third-fifth speed synchronizer S1 includes: a hub 51 spline-connected to the first input shaft 11 so as to be unmovable in the axial direction and relatively unrotatable; a sleeve 52 spline-connected to an outer periphery of the hub 51 so as to be slidable in the axial direction and relatively unrotatable; a blocking ring 53 disposed on a right side surface of the hub 51; a synchronizer spring 54 disposed between the blocking ring 53 and the hub 51; and a dog gear 55 spline-connected to a left end of the third speed input gear 24. The third speed input gear 24 disposed on a right side of the third-fifth speed synchronizer S1 is supported on the first input shaft 11 so as to be relatively rotatable, via needle bearings 56. A tooth surface portion 24a, which has tooth surfaces, is formed on a right end side of the third speed input gear 24. A flange-shaped contact portion 24b projecting outward in a radial direction is formed on a left end side of the third speed input gear 24. A cylindrical portion 24c, which is smaller in diameter than the tooth surface portion 24a and the contact portion 24b, is formed between the tooth surface portion 24a and the contact portion 24b. The cylindrical portion 24c has a predetermined length in the axial direction. An outer peripheral portion of the second speed output gear 33 fixedly provided to the first output shaft 13 is fitted in an outer periphery of the cylindrical portion 24c which forms a recessed portion interposed between the tooth surface portion 24a and the contact portion 24b.

The third-fifth speed synchronizer S1 of the embodiment is of a double-cone type. The blocking ring 53 includes: an outer ring 57 situated on an outer side in the radial direction; an inner ring 58 situated on an inner side in the radial direction; and an intermediate ring 59 interposed between the outer ring 57 and the inner ring 58.

As shown in FIGS. 2 to 5, the hub 51 of the third-fifth speed synchronizer S1 includes: spline teeth 51a formed in an inner periphery of the hub 51, and connected to the first input shaft 11; spline teeth 51b formed in an outer periphery of the hub 51, and meshing with spline teeth 52a (see FIG. 2) in an outer periphery of the sleeve 52; six recessed portions 51c formed in each of left and right axial end surfaces of the hub 51, and arranged at intervals of 60 degrees; and three cutouts 51d formed in an outer peripheral portion of the hub 51, and arranged at intervals of 120 degrees.

The outer ring 57 of the blocking ring 53 includes: dog teeth 57a projectingly provided to an outer peripheral surface of the outer ring 57, and being meshable with the spline teeth 52a of the sleeve 52; friction members 57b formed in an inner peripheral surface of the outer ring 57, and being in contact with an outer peripheral surface of the intermediate ring 59; and three protrusions 57c projectingly provided to the outer peripheral surface of the outer ring 57 at intervals of 120 degrees. The protrusions 57c are fitted in the respective cutouts 51d of the hub 51 with clearances created between the protrusions 57c and the corresponding cutouts 51d in a peripheral direction. The clearances allow the outer ring 57 to turn relative to the hub 51 by a predetermined angle.

The inner ring 58 of the blocking ring 53 includes: friction members 58a formed in an outer peripheral surface of the inner ring 58, and being in contact with an inner peripheral surface of the intermediate ring 59; twelve protrusions 58b projectingly provided to an end portion of the inner ring 58 on a hub 51 side at predetermined intervals; and six cutouts 58c (see FIG. 4) formed in an end portion of the inner ring 58 on a dog gear 55 side at intervals of 60 degrees.

The intermediate ring 59 of the blocking ring 53 includes: a smooth outer peripheral surface in contact with the friction members 57b of the outer ring 57; and a smooth inner peripheral surface in contact with the friction members 58a of the inner ring 58. The intermediate ring 59 includes three protrusions 59a formed on an end portion of the intermediate ring 59 on the dog gear 55 side at intervals of 120 degrees.

The dog gear 55 includes: dog teeth 55a projectingly provided to an outer peripheral surface of the dog gear 55, and being meshable with the spline teeth 52a of the sleeve 52; spline teeth 55b formed in an inner peripheral surface of the dog gear 55, and spline-connected to the third speed input gear 24 so as to be relatively unrotatable and unmovable in the axial direction; and three through-holes 55c formed in the dog gear 55 at intervals of 120 degrees. The three protrusions 59a of the intermediate ring 59 are engaged with the three through-holes 55c of the dog gear 55.

The reason why what the protrusions 59a of the intermediate ring 59 are engaged with are the through-holes 55c but not recessed portions is that: if the recessed portions were formed in the dog gear 55, thin portions are created there, and become fragile due to heat treatment; and the through-holes 55c are easier to process than the recessed portions, and help to make the dog gear 55 lighter in weight.

Next, descriptions will be provided for an operation of the embodiment of the present invention including the foregoing configuration.

To begin with, descriptions will be provided for synchronous working of the third-fifth speed synchronizer S1 on the basis of FIG. 2.

Once the sleeve 52 in an illustrated neutral condition is driven, for example rightward, by a shift fork (not illustrated), the sleeve 52 moves with the spline teeth 52a guided by the spline teeth 51b of the hub 51, and load of the synchronizer spring 54 pressed by tooth tips of the spline teeth 52a of the sleeve 52 is transmitted to the blocking ring 53. Thereby, the blocking ring 53 is biased toward the third speed input gear 24.

When the sleeve 52 advances further, the tooth tips of the spline teeth 52a of the sleeve 52 come into contact with tooth tips of the dog teeth 57a of the outer ring 57 of the blocking ring 53; the friction members 57b of the outer ring 57 and the outer peripheral surface of the intermediate ring 59 come into pressure contact with each other; and the friction members 58a of the inner ring 58 and the inner peripheral surface of the intermediate ring 59 come into pressure contact with each other. Thereby, the friction force produces synchronous torque. As a result, rotation of the intermediate ring 59 is transmitted to the dog gear 55 via the protrusions 59a and the through-holes 55c, and the synchronous torque makes rotation of the third speed input gear 24 synchronize with rotation of the sleeve 52 (namely, rotation of the first input shaft 11). Thus, the spline teeth 52a of the sleeve 52 can smoothly mesh with the dog teeth 57a of the outer ring 57.

After the rotation of the sleeve 52 completely synchronizes with the rotation of the third speed input gear 24, the torque disappears. For this reason, once the sleeve 52 advances much further, the spline teeth 52a of the sleeve 52 move through the dog teeth 57a of the outer ring 57, and the sleeve 52 and the outer ring 57 are integrally connected together; and the spline teeth 52a of the sleeve 52 further move through, and engages with, the dog teeth 55a of the dog gear 55 which is integrated with the third speed input gear 24. Thereby, a gear shift completes.

As shown in FIG. 2, meanwhile, if the spline teeth 52a of the sleeve 52 does not smoothly mesh with the dog teeth 55a of the dog gear 55 when the sleeve 52 moves rightward in order for the third-fifth speed synchronizer S1 to connect the third speed input gear 24 to the first input shaft 11, the dog gear 55, as pressed by the sleeve 52, may lean in a direction of an arrow A, with the spline teeth 55b in the inner periphery of the dog gear 55 as a fulcrum. An inner end portion of the leaning dog gear 55 in the radial direction may move in a direction of an arrow B, and the inner ring 58 of the blocking ring 53 may be strongly squeezed between the hub 51 and the dog gear 55. Accordingly, the inner ring 58 may become damaged.

If the dog gear 55 is integrally welded, not spline-connected, to the third speed input gear 24, there is no possibility that the dog gear 55, as pressed by the sleeve 52, leans in the direction of the arrow A. Due to manufacturing requirements, however, it is difficult to join the third speed input gear 24 and the dog gear 55 together by welding. To put it concretely, the tooth surfaces are machined on the gear and the dog gear, the gear and the dog gear are integrally welded together, welding stress is removed by heat treatment, and after that, normally, the tooth surfaces of the gear and the tooth surfaces of the dog gear need to be finished by polishing with use of a tooth grinder. Once, however, the gear and the dog gear are integrated together by welding, polishing cannot be achieved because a tooth grinder for polishing the tooth surfaces of the gear interferes with the tooth surfaces of the dog gear while a tooth grinder for polishing the tooth surfaces of the dog gear interferes with the tooth surfaces of the gear. For this reason, it is necessary that the gear and the dog gear be spline-connected to each other after as separate members, the tooth surfaces of the gear and the tooth surfaces of the dog gear are polished.

According to the embodiment, though as described above, the third speed input gear 24 and the dog gear 55, which are made as the separate members, are spline-connected to each other, it is possible to prevent the dog gear 55 from leaning in the direction of the arrow A, because: the flange-shaped contact portion 24b formed in the third speed input gear 24 is in contact with a back surface of the dog gear 55 as viewed from the sleeve 52 side (see FIG. 2); and the contact portion 24b thus supports pressing force which is received from the sleeve 52. Thereby, it is possible to prevent the inner ring 58 from being strongly squeezed between the dog gear 55 and the hub 51, and to prevent damage on the inner ring 58.

According to the embodiment, particularly, though the dog gear 55 is likely to be less strong in parts corresponding to the through-holes 55c in which the protrusions 59a of the intermediate ring 59 are fitted, it is possible to prevent concentration of stress on the parts corresponding to the through-holes 55c, because the contact portion 24b of the third speed input gear 24 extends outward of the through-holes 55c of the dog gear 55 in the radial direction.

In addition, even though providing of the contact portion 24b to the third speed input gear 24 helps to prevent leaning of the dog gear 55, it is difficult to completely prevent the dog gear 55 from tilting due to the load received from the sleeve 52 and accordingly pressing the inner ring 58 in the direction of the arrow B in FIG. 2.

Figure 5:
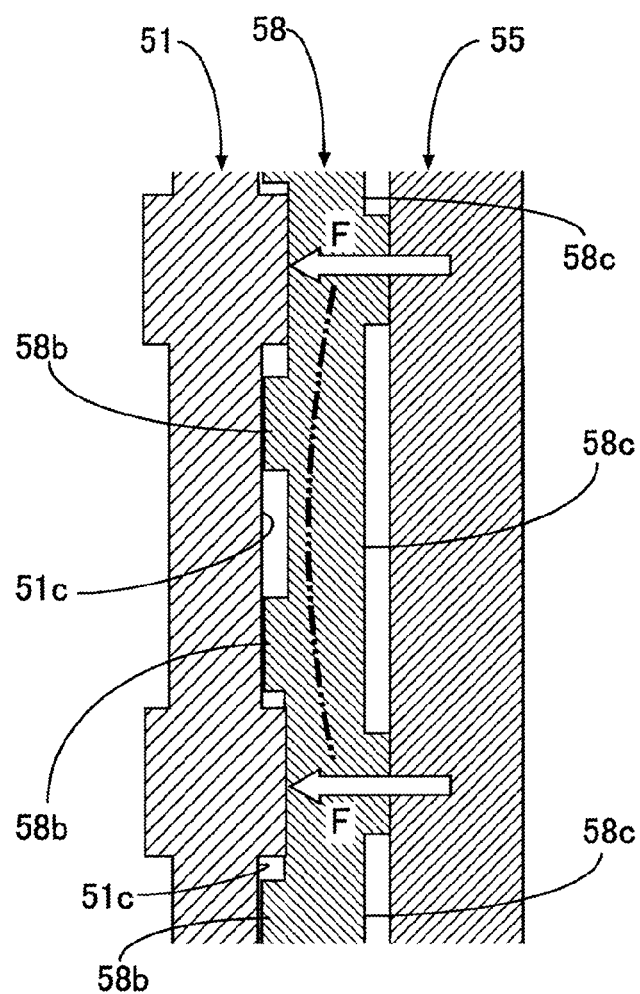
FIG. 5 is a sectional view taken along a 5-5 line in FIG. 2.

When, as shown in FIG. 5, the dog gear 55 leans and thus presses the inner ring 58 toward the hub 51, the inner ring 58, as pushed by the dog gear 55, curves in an arc toward the recessed portions 51c (see a two-dot chain line) since the hub 51 includes the recessed portions 51c which face the inner ring 58. This is likely to cause damage on the inner ring 58. Particularly, because the inner ring 58 made of copper-based CSM-6E is less rigid and more easily deformed than the dog gear 55 made of carburized SCr420 material and the third speed input gear 24 made of carburized HSDv7 material, it is necessary to prevent the deformation of the inner ring 58.

According to the embodiment, since the cutouts 58c are formed in the end surface of the inner ring 58 which is in contact with the dog gear 55, pressing load F (see FIG. 5) from the dog gear 55 is efficiently transmitted from opposite sides of each of the cutouts 58c to, and supported by, opposite sides of each of the recessed portions 51c of the hub 51. Thereby, it is possible to prevent the inner ring 58 from becoming damaged due to its deformation.

As shown in FIG. 1, the third speed-reverse output gear 32 fixedly provided to the first output shaft 13 transmits the driving force, which is inputted from the third speed input gear 24 or the reverse idler gear 34, to the final gear 38. If the second speed input gear 28 were designed to directly mesh with the third speed-reverse output gear 32, it would be possible to eliminate the second speed output gear 33, and thereby to reduce the number of parts. Such a design, however, would increase load on the third speed-reverse output gear 32 because the driving force is inputted into the third speed-reverse output gear 32 from the three gears, namely, the third speed input gear 24, the reverse idler gear 34 and the second speed input gear 28. For this reason, the embodiment decreases the load on the third speed-reverse output gear 32 by intentionally providing the second speed output gear 33 which meshes with the second speed input gear 28.

As a result, however, a problem arises where: the outer peripheral portion of the second speed input gear 28 interferes with the third speed input gear 24; and the layout becomes difficult. According to the embodiment, however, it is possible to realize the compact layout by avoiding the interference between the third speed input gear 24 and the second output gear 33, since: as shown in FIG. 2, the cylindrical portion 24c, which is smaller in diameter than the tooth surface portion 24a and the contact portion 24b, is formed in the axially intermediate portion of the third speed input gear 24; and the outer peripheral portion of the second output gear 33 is opposite to the outer periphery of the cylindrical portion 24c.

Although the foregoing descriptions have been provided for the embodiment of the present invention, various design modification can be made to the present invention without departing from the gist of the present invention.

For example, the skeleton of the transmission of the present invention is not limited to the embodiment.

Furthermore, the transmission gear of the present invention is not limited to the third speed input gear 24 of the embodiment, and the synchronizer of the present invention is not limited to the third-fifth speed synchronizer S1 of the embodiment.

What is claimed is:

1. A transmission comprising a synchronizer capable of connecting together a hub connected to a rotary shaft, and a dog gear relatively unrotatably spline-connected to a transmission gear which is relatively rotatably supported on the rotary shaft, wherein:
the synchronizer includes:
a sleeve spline-connected to the hub so as to be relatively unrotatable, and slidable in an axial direction, and
a blocking ring disposed between the hub and the dog gear, and enabling the hub and the dog gear to frictionally engage with each other in response to movement of the sleeve,
the blocking ring includes:
an outer ring disposed on an outer side of the blocking ring in a radial direction, having dog teeth meshable with the sleeve in an outer periphery of the outer ring, and engaged with the hub so as to be relatively rotatable by a predetermined angle,
an inner ring disposed on an inner side of the blocking ring in the radial direction, and engaged with the hub so as to be relatively rotatable by a predetermined angle, and
an intermediate ring disposed between the outer ring and the inner ring in the radial direction, and being in slide contact with an inner peripheral surface of the outer ring and an outer peripheral surface of the inner ring,
wherein the dog gear includes a recessed portion engaged with a protrusion of the intermediate ring,
said inner ring having an upper surface extending in said axial direction and facing towards a lower surface of said intermediate ring, a lower surface extending in said axial direction and facing towards said rotary shaft, a perimeter end surface extending between said upper and lower surfaces of said inner ring transverse to said axial direction, and an interior end surface extending between said upper and lower surfaces of said inner ring transverse to said axial direction and facing said hub, wherein said dog gear contacts said inner ring at only said perimeter end surface of said inner ring,
the transmission gear includes
a tooth surface portion formed on one axial end side of the transmission gear, and having tooth surfaces; and
a contact portion formed on an opposite axial end side of the transmission gear, and being in contact with the dog gear, and
the contact portion extends outward of the recessed portion in the radial direction.

2. The transmission according to claim 1, wherein the recessed portion of the dog gear is a through-hole penetrating through the dog gear in the axial direction.

3. The transmission according to claim 1, further comprising:
a first input shaft, a second input shaft and an output shaft disposed in parallel to one another;
a first clutch and a second clutch which selectively transmit driving force of a driving source to any of the first input shaft and the second input shaft;
a plurality of input gears supported relatively rotatably on the first and second input shafts;
a plurality of output gears fixedly provided to the output shaft, and meshing with the plurality of input gears;
a first synchronizer capable of connecting the first input shaft to a first input gear which is one of the plurality of input gears supported on the first input shaft; and
a second synchronizer capable of connecting the second input shaft to a second input gear which is one of the plurality of input gears supported on the second input shaft, wherein
the first input gear meshes with a first output gear which is one of the plurality of output gears,
the second input gear meshes with a second output gear which is another of the plurality of output gears, the rotary shaft is the first input shaft, the transmission gear is the first input gear, the synchronizer is the first synchronizer, and an outer peripheral portion of the second output gear is opposite to an outer peripheral portion of a cylindrical portion of the transmission gear which is formed between the tooth surface portion and the contact portion of the transmission gear and which is smaller in diameter than the tooth surface portion and the contact portion.

4. The transmission according to claim 1, wherein said perimeter end surface of said inner ring includes a plurality of cutouts, whereby the pressing load from the dog gear against said perimeter end surface of said inner ring is transmitted to said inner ring at opposite sides of said cut outs such as to inhibit damage to said inner ring due to deformation.

5. The transmission according to claim 1, wherein the hub includes a plurality of recessed portions spaced out in a peripheral direction, the inner ring includes a plurality of protrusions fitted in the recessed portions of the hub, and a plurality of cutouts formed in an end surface of the inner ring on a dog gear side at positions corresponding to the plurality of recessed portions of the hub.

6. The transmission according to claim 5, wherein the recessed portion of the dog gear is a through-hole penetrating through the dog gear in the axial direction.

7. The transmission according to claim 5, further comprising:

a first input shaft, a second input shaft and an output shaft disposed in parallel to one another;

a first clutch and a second clutch which selectively transmit driving force of a driving source to any of the first input shaft and the second input shaft;

a plurality of input gears supported relatively rotatably on the first and second input shafts;

a plurality of output gears fixedly provided to the output shaft, and meshing with the plurality of input gears;

a first synchronizer capable of connecting the first input shaft to a first input gear which is one of the plurality of input gears supported on the first input shaft; and a second synchronizer capable of connecting the second input shaft to a second input gear which is one of the plurality of input gears supported on the second input shaft, wherein the first input gear meshes with a first output gear which is one of the plurality of output gears, the second input gear meshes with a second output gear which is another of the plurality of output gears, the rotary shaft is the first input shaft, the transmission gear is the first input gear, the synchronizer is the first synchronizer, and an outer peripheral portion of the second output gear is opposite to an outer peripheral portion of a cylindrical portion of the transmission gear which is formed between the tooth surface portion and the contact portion of the transmission gear and which is smaller in diameter than the tooth surface portion and the contact portion.

* * * * *